(12) United States Patent
Tondorf et al.

(10) Patent No.: US 7,271,920 B2
(45) Date of Patent: Sep. 18, 2007

(54) POSITION-MEASURING DEVICE

(75) Inventors: Sebastian Tondorf, Waging am See (DE); Walter Huber, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 416 days.

(21) Appl. No.: 10/946,872

(22) Filed: Sep. 21, 2004

(65) Prior Publication Data

US 2005/0061961 A1    Mar. 24, 2005

(30) Foreign Application Priority Data

Sep. 23, 2003  (DE) ............... 103 45 018
May 12, 2004  (DE) .......... 10 2004 024 581

(51) Int. Cl.
| | |
|---|---|
| G01B 11/14 | (2006.01) |
| G01B 11/02 | (2006.01) |
| G01N 21/86 | (2006.01) |
| G01V 8/00 | (2006.01) |
| G01D 5/34 | (2006.01) |
| G01D 5/36 | (2006.01) |

(52) U.S. Cl. ............... 356/614; 356/499; 250/231.13; 250/237 G; 250/559.29

(58) Field of Classification Search ............ None
See application file for complete search history.

(56) References Cited

U.S. PATENT DOCUMENTS

| | | | |
|---|---|---|---|
| 4,912,322 A | 3/1990 | Ichikawa | |
| 5,739,911 A | 4/1998 | Holzapfel et al. | |
| 6,541,761 B1 | 4/2003 | Holzapfel et al. | |
| 6,552,810 B1 | 4/2003 | Hermann et al. | |
| 6,713,756 B2 * | 3/2004 | Yamamoto et al. | 250/231.13 |
| 6,794,637 B1 * | 9/2004 | Holzapfel et al. | 250/231.13 |
| 2001/0017349 A1 * | 8/2001 | Holzapfel et al. | 250/231.13 |
| 2005/0077457 A1 * | 4/2005 | Hofer | 250/231.13 |
| 2006/0033020 A1 * | 2/2006 | Huber | 250/231.13 |

FOREIGN PATENT DOCUMENTS

| | | |
|---|---|---|
| EP | 1 028 309 | 8/2000 |
| EP | 1 081 457 | 3/2001 |
| EP | 1114983 A1 * | 7/2001 |
| EP | 0 754 933 | 12/2001 |
| WO | WO 0065310 A2 * | 11/2000 |

OTHER PUBLICATIONS

"Search and Examination Report," Singapore Patent Application No. 200407930-7, dated Jan. 17, 2007.

* cited by examiner

*Primary Examiner*—Gregory J. Toatley, Jr.
*Assistant Examiner*—Gordon J. Stock, Jr.
(74) *Attorney, Agent, or Firm*—Kenyon & Kenyon LLP

(57) ABSTRACT

A position-measuring device includes: a measuring graduation provided on a material measure going around in ring-like fashion; a scanning unit for optically scanning the measuring graduation using electromagnetic radiation; a scanning plate with a periodic scanning graduation which is arranged in the beam path of the electromagnetic radiation used for scanning the measuring graduation, so that the radiation interacts both with the scanning graduation and with the measuring graduation; and a detector of the scanning unit, the detector surface of which is used for detecting the electromagnetic radiation after interaction with the scanning graduation and the measuring graduation and which is arranged with a period ($P_D$) for detecting electromagnetic radiation in the form of a stripe pattern. The period $P_M$ of the measuring graduation and the period $P_A$ of the scanning graduation may be coordinated so that $1/(1/P_A - 1/P_M) < P_D$.

14 Claims, 3 Drawing Sheets

POSITION-MEASURING DEVICE

CROSS-REFERENCE TO RELATED APPLICATIONS

The present application claims priority to Application No. 103 45 018.1, filed in the Federal Republic of Germany on Sep. 23, 2003, and claims priority to Application No. 10 2004 024 581.9,filed in the Federal Republic of Germany on May 12, 2004, each of which is expressly incorporated herein in its entirety by reference thereto.

FIELD OF THE INVENTION

The present invention relates to a position-measuring device.

BACKGROUND INFORMATION

A position-measuring device for determining the relative position of two objects movable relative to each other along a measuring direction (angular position measuring device) includes: a periodic measuring graduation configured on a ring-like material measure (i.e., on a ring-like support), e.g., in the form of a measuring strip; a scanning unit for optically scanning the measuring graduation using electromagnetic radiation (using light) which is generated in an illumination device (light source) of the scanning unit, the material measure and the scanning unit movable relative to each other along the measuring direction; a scanning plate of the scanning unit having a periodic graduation (scanning graduation), which is arranged in the beam path of the electromagnetic radiation used for scanning the measuring graduation, so that this electromagnetic radiation interacts both with the scanning graduation and with the measuring graduation; and a detector of the scanning unit whose detector surface is used for detecting the electromagnetic radiation modified by the scanning graduation and the measuring graduation, and is arranged with a period $P_D$ for detecting an intensity pattern formed by this modified electromagnetic radiation.

Period $P_D$ is selected so that, given a linear arrangement of the measuring strip along a straight line, period $P_D$ agrees with the period of the stripe pattern (Vernier pattern) which is generated by the interaction of the radiation, used for scanning the material measure, with the scanning graduation on one hand and with the measuring graduation on the other hand. This stripe pattern corresponds to a beat, caused by the combination of two periodic operations, namely, the interaction of the electromagnetic radiation with the scanning graduation on one hand, and the interaction of the electromagnetic radiation with the measuring graduation on the other hand.

The measuring principle on which the aforesaid position-measuring device is based is described, for example, in European Published Patent Application No. 1 081 457, European Published Patent Application No. 1 028 309 and European Published Patent Application No. 0 754 933.

European Published Patent Application No. 1 028 309 describes an optical position-measuring device for determining the relative position of two objects movable relative to each other along a measuring direction. It includes at least one periodic measuring graduation connected to one of the two objects, as well as a scanning unit connected to the other object and therefore movable relative to the measuring graduation along the measuring direction. The scanning unit has a light source, at least one scanning graduation, as well as a detector system in a detector plane that is made up of a plurality of radiation-sensitive detector elements arranged one after the other in the measuring direction.

If, given a position-measuring device of the type indicated at the outset, a measuring strip used as the carrier of the measuring graduation is arranged in ring-like fashion, e.g., by applying the measuring strip on a cylindrical body in the form of a drum, the position-measuring device may then be used in particular for angular measurement. Compared with a linear arrangement of the measuring strip (so that it extends in the manner of a scale along a straight line), when working with the ring-like arrangement of the measuring strip, e.g., along a circular arc, effects occur which impair the intensity of the radiation received at the detector of the scanning unit. An effect is when, given a ring-like arrangement of the measuring strip, because of the curvature of the measuring strip associated with that, the inner surface of the measuring strip is somewhat compressed and the outer surface of the measuring strip is somewhat elongated. The extent of this compression and elongation depends upon the thickness of the measuring strip, and is all the greater, the greater its thickness. For a measuring graduation provided on the outer surface of a measuring strip arranged in ring-like fashion, this effect leads to an enlargement of the measuring-graduation period, since the outer surface of the measuring strip is elongated (compared to its linear arrangement).

Conversely, when scanning a measuring strip arranged in a ring shape, using a scanning unit that is arranged at a defined distance in front of the outer surface of the measuring strip provided with the measuring graduation, a projection effect occurs which—viewed from the surface of the scanning plate—causes the distance between the individual markings (e.g., graduation marks) of the measuring graduation to seemingly become increasingly smaller toward the outer edges of the scanning plate. This is attributable to the projection of the curved outer ring surface of the measuring strip, provided with the measuring graduation, onto the planar, two-dimensional surface of the scanning plate provided with the scanning graduation.

The two aforesaid effects are contrary. However, the projection effect depends exclusively on the curvature of the measuring strip, while the elongation effect at the outer surface of the measuring strip depends both on its curvature and on its thickness. For comparatively thick measuring strips having a thickness of, for example, 300 µm, the two contrary effects may offset each other over a large range of various curvatures to the extent that the intensity pattern generated at the radiation-sensitive surface of the detector exhibits a sufficient contrast for a subsequent evaluation. For very thin measuring strips having a thickness of markedly less than 300 µm, e.g., less than 100 µm, however, the elongation effect at the outer surface of the measuring strip is only so small that it is no longer able to sufficiently compensate for the projection effect in the case of strong curvatures. Because of the poor contrast of the intensity pattern, the signal amplitude detected by the detector can become so small that a reliable evaluation for determining position is not possible.

In the following, when using the term "measuring strip," provided it is not geared to a measuring strip of finite thickness, the intention is in each case to also include the limit case that the thickness of the measuring strip approaches zero. This limit case corresponds to a situation in which the measuring graduation is applied directly on the (cylindrical) body (in the form of a drum), which is otherwise used for accommodating the measuring strip. The

SUMMARY

According to an example embodiment of the present invention, a position-measuring device may have a simple design and may permit the combination of an annular material measure with a scanning plate having a planar, two-dimensional surface, and having an associated detector with a two-dimensional radiation-sensitive surface.

Accordingly, the period of scanning graduation $P_A$ on one hand and the period of measuring graduation $P_M$ on the other hand are coordinated with one another such that $1/(1/P_A-1/P_M)<P_D$. This means that by the interaction of the light with the periodic scanning graduation on one hand and the periodic measuring graduation on the other hand, given a linear arrangement of the material measure in the form of a measuring strip, a stripe pattern may be generated, the period (given by the expression $1/(1/P_A-1/P_M)$) of which may be smaller than period $P_D$ of a stripe pattern for whose scanning the radiation-sensitive surface of the detector is designed and provided. Particularly for very thin measuring strips, the seeming reduction of the measuring-strip period occurring due to the above-indicated projection effect when working with a ring-like arrangement (which leads locally to an enlargement of the period of the stripe pattern) may be compensated for.

This may be achieved according to an example embodiment of the present invention in that, on one hand, the period of the material measure, e.g., in the form of a measuring strip, is increased, so that $P_M>1/(1/P_A-1/P_D)$, or in that the period of the scanning plate is correspondingly reduced, so that $P_A<1/(1/P_D+1/P_M)$. In this context, it is assumed that $P_M>P_A$ (including the limit case $P_A\rightarrow P_M$ explained below). The reverse case is possible, but may be of lesser practical relevance.

The following explanations concerning an example embodiment of the position-measuring device according to the present invention—also in quantitative regard—are in each instance also valid in the limit case $P_A\rightarrow P_M$. Therefore, an example embodiment of the present invention may also be put into effect for this limit case in which period $P_D$ of the stripe pattern to be detected approaches infinity.

Using the design approach hereof, it may be possible to use the same detector (having a planar, radiation-sensitive surface) as a component of the scanning unit movable relative to the measuring strip when working with a ring-like arrangement of a measuring strip, e.g., along a circular arc, as when working with a linear arrangement of the measuring strip. It may thereby be possible to produce the detector inexpensively in correspondingly greater quantity.

In this context, the limit case in which the period of the scanning graduation tends toward the period of the measuring graduation is also expressly to be included, so that the period of the Vernier stripe pattern generated (in the linear case) tends toward infinity (cf., European Published Patent Application No. 0 754 933).

The detector may be a so-called structured detector (as described, for example, in European Published Patent Application No. 1 028 309), the radiation-sensitive surface of which is formed by detector regions, e.g., in the form of individual detector elements (photoelements), arranged periodically one after the other. In the present case, period $P_D$ of the arrangement of the detector regions or detector elements is larger than the stripe-pattern period $1/(1/P_A-1/P_M)$, which, in response to the modification of the period of the measuring graduation and/or of the scanning plate, may be generated by the electromagnetic radiation, used for the scanning, after interaction both with the scanning grating and with the measuring graduation (in the case of a planar arrangement of the measuring strip). In other words, period $P_D$ of the detector regions or detector elements of the detector is selected so that, for a measuring strip having a specific period of the measuring graduation and for a scanning plate having a specific period of the scanning graduation—this measuring strip being provided for the linear arrangement along a straight line—period $P_D$ agrees exactly with the period of the stripe pattern that is generated by interaction of the radiation, used for the scanning, with the scanning graduation and the measuring graduation. According to an example embodiment of the present invention, however, for scanning a measuring strip, arranged in ring-like fashion along a circular arc, for angular measurement, the period of the measuring graduation and/or the period of the scanning graduation is/are modified so that, given linear arrangement of the indicated measuring strip (provided for a ring-like arrangement), the period of the detector elements may be larger than that of the stripe pattern that may occur in the case of a linear arrangement of the measuring strip and the modification according to an example embodiment of the present invention of the period of the measuring graduation and/or of the scanning plate. In this manner, it is possible to largely compensate for the projection effect in the case of a curved arrangement of the measuring strip.

Thus, according to an example embodiment of the present invention, when working with a position-measuring system having a measuring strip arranged in ring-like fashion and an allocated detector having a planar, two-dimensional, radiation-sensitive surface, the period of the scanning graduation and/or the period of the measuring graduation—compared to a position-measuring device having a measuring strip arranged in a straight line and an identical detector—is/are modified so that the signal amplitude of the scanning signals is perceptibly greater than if the measuring strip of a linear position-measuring device were used directly for forming an angular position measuring system without modification of the period of the scanning graduation or the measuring graduation. In this context, the linear position-measuring system utilized for the comparison may in each case be configured such that, given linear arrangement of the measuring strip along a straight line, the stripe pattern appearing on the radiation-sensitive surface of the detector has precisely the period for whose scanning the corresponding detector is designed and provided for attaining maximum intensity of the electromagnetic radiation on the radiation-sensitive surface. In the case of a periodically structured detector, this means, e.g., that the radiation-sensitive surface of the detector has a period that agrees with the period of the stripe pattern up to an integral multiple.

For typical thicknesses and radii of a measuring strip used for angular measurement, the modification of the period of the scanning graduation and/or the measuring graduation necessary for this purpose is at least 0.05% and not more than 2%. For example, it may be between 0.1% and 1%.

In this context, to be understood by the period of the detector is not necessarily the period of the geometrical arrangement of the individual detector regions or detector elements. Rather, the electrical interconnection of the individual detector regions or detector elements may also be taken into account. Thus, in the case of a structured detector, it may be provided that four detector elements are arranged on a length which corresponds to the period of the stripe pattern received on the radiation-sensitive surface of the detector, each detector element being allocated to one phase, e.g., to one of the phases 0°, 90°, 180°, 270°. In this context, a plurality of groups of four detectors each are then arranged one after the other. From the individual detector groups, in each case those detector regions or detector elements are interconnected which are assigned to the same phase. The period of such a structured detector is then in each case defined by the width of one detector group that includes a plurality of detector regions, e.g., four detector regions.

When using a detector having a two-dimensional, planar, radiation-sensitive surface for scanning the measuring graduation on a material measure going around in ring-like fashion, the detector extends at a defined (radial) distance from the material-measure surface provided with the measuring graduation, in a tangential direction (i.e., parallel to a tangent at the outer periphery of a measuring strip arranged in ring-like fashion). Accordingly, in the case of a structured detector, the individual detector regions or detector elements are arranged one after the other along a direction parallel to a tangent of the material measure extending around in a ring shape. The two disturbance effects indicated at the outset, namely, the elongation of the outer surface of a measuring strip provided with the measuring graduation on one hand, and the projection effect on the other hand do not completely offset each other even given the correction according to an example embodiment of the present invention of the scanning graduation and/or the period of the measuring graduation. Rather, the elongation effect predominates in the (observed in the tangential direction) middle region of the radiation-sensitive surface of the detector, since the projection does not play so great a role here. That is to say, in the middle region of the radiation-sensitive surface of the detector, the period of the measuring strip arranged in a ring shape (thus the distance between the individual markings or graduation marks of the measuring graduation) seems to be larger than provided (because of the elongation effect), while at the edge regions of the detector—observed in the tangential direction—because of the predominance of the projection effect, the period of the measuring graduation seems to become smaller. The period of the scanning graduation on one hand and the period of the measuring graduation on the other hand are coordinated such that the stripe pattern generated on the radiation-sensitive surface may deviate as little as possible from period $P_D$ of that stripe pattern for whose detection the radiation-sensitive surface of the detector is designed (e.g., with respect to the periodic arrangement of detector regions or detector elements in the case of a structured detector).

An example embodiment of the present invention may also be used in the case when the measuring graduation is provided on the inner surface (inner ring surface) of a measuring strip. In this case, in addition to the projection effect, a compression effect acting in the same direction comes to bear on the inner ring surface, which means the period of the measuring graduation may have to be enlarged or the period of the scanning graduation may have to be reduced for the compensation.

Both the scanning graduation and the measuring graduation may be formed by so-called amplitude gratings that interact with electromagnetic radiation (e.g., light) such that—according to the period of the respective grating—a periodic sequence of brighter and darker light regions is generated. If the position-measuring device is operated in the so-called reflection method, then in each case markings (graduation marks) of greater and lesser reflectivity with regard to the electromagnetic radiation (light) used for the scanning are provided in the corresponding grating. In contrast, when using the so-called transmitted-light method, the markings (graduation marks) arranged periodically one after the other differ in transmissivity for the electromagnetic radiation (light) used for the scanning.

In addition, the scanning graduation may also take the form in particular of a so-called MAP grating (mixed amplitude phase grating) as illustrated, for example, in FIGS. 2a and 2b of European Published Patent Application No. 1 081 457.

Alternatively, the scanning graduation may also be formed by a phase grating.

Collimated (parallelized) electromagnetic radiation in the form of light may be used for scanning the material measure.

According to an example embodiment of the present invention, a position-measuring device includes: a measuring graduation arranged around a material measure arranged in a ring shape; and a scanning unit configured to optically scan the measuring graduation by electromagnetic radiation. The scanning unit includes: a scanning plate including a periodic scanning graduation arranged in a beam path of the electromagnetic radiation and arranged so that the electromagnetic radiation interacts with the scanning graduation and the measuring graduation; and a detector including a detector surface configured to detect the electromagnetic radiation after interaction with the scanning graduation and the measuring graduation in a stripe pattern with a period. The condition $1/(1/P_A-1/P_M)<P_D$ is satisfied, with $P_M$ representing a period of the measuring graduation, $P_A$ representing a period of the scanning graduation, and $P_D$ representing the period of the stripe pattern.

The period of the measuring graduation may satisfy the condition $P_M>1/(1/P_A-1/P_D)$.

The period of the scanning graduation may satisfy the condition $P_A<1/(1/P_D+1/P_M)$ The detector surface of the detector may include a periodic arrangement of detector regions having a period corresponding to the period of the stripe pattern.

The detector regions may include detector elements.

The detector regions may include photoelements.

Groups of four detector regions may be arranged as detector groups, and the detector groups may be arranged periodically one after another with a defined period.

Individual detector regions of each detector group may correspond to one phase, and in-phase detector regions of different detector groups may be electrically interconnected.

The detector may include a planar, substantially two-dimensional detector surface.

At least one of (a) the measuring graduation and (b) the scanning graduation may include an amplitude grating.

The scanning graduation may include a mixed amplitude phase (MAP) grating.

The scanning graduation may include a phase grating.

The electromagnetic radiation may includes collimated light.

The period of the measuring graduation and the period of the scanning graduation may be configured to maximize an intensity of an output signal generated by the detector.

A deviation of the period of the measuring graduation from a value of $1/(1/P_A-1/P_D)$ may be at least 0.05%, e.g., between 0.1% and 1%.

A deviation of the period of the scanning graduation from a value of $1/(1/P_D+1/P_M)$ may be at least 0.05%, e.g., between 0.1% and 1%.

The material measure may include a ring-shaped measuring strip.

According to an example embodiment of the present invention, a position-measuring device includes: a measuring graduation arranged around a material measure arranged in a ring shape; and a scanning unit configured to optically scan the measuring graduation by electromagnetic radiation. The scanning unit includes: a scanning plate including a periodic scanning graduation arranged in a beam path of the electromagnetic radiation and arranged so that the electromagnetic radiation interacts with the scanning graduation and the measuring graduation; and a detector including a detector surface configured to detect the electromagnetic radiation after interaction with the scanning graduation and the measuring graduation in a stripe pattern with a period. The condition $1/(1/P_A - 1/P_M) < P_D$ is satisfied, with $P_M$ representing a period of the measuring graduation, $P_A$ representing a period of the scanning graduation, and $P_D$ representing the period of the stripe pattern. The detector surface of the detector includes a periodic arrangement of detector regions having a period corresponding to the period of the stripe pattern. The scanning graduation includes a mixed amplitude phase grating.

Other features and aspects hereof are described in the following description of an exemplary embodiment with reference to the appended Figures.

BRIEF DESCRIPTION OF THE DRAWINGS

FIG. 1b illustrates the radiation-sensitive surface of a structured detector of a scanning unit illustrated in FIG. 1a.

DETAILED DESCRIPTION

Figure 1A:
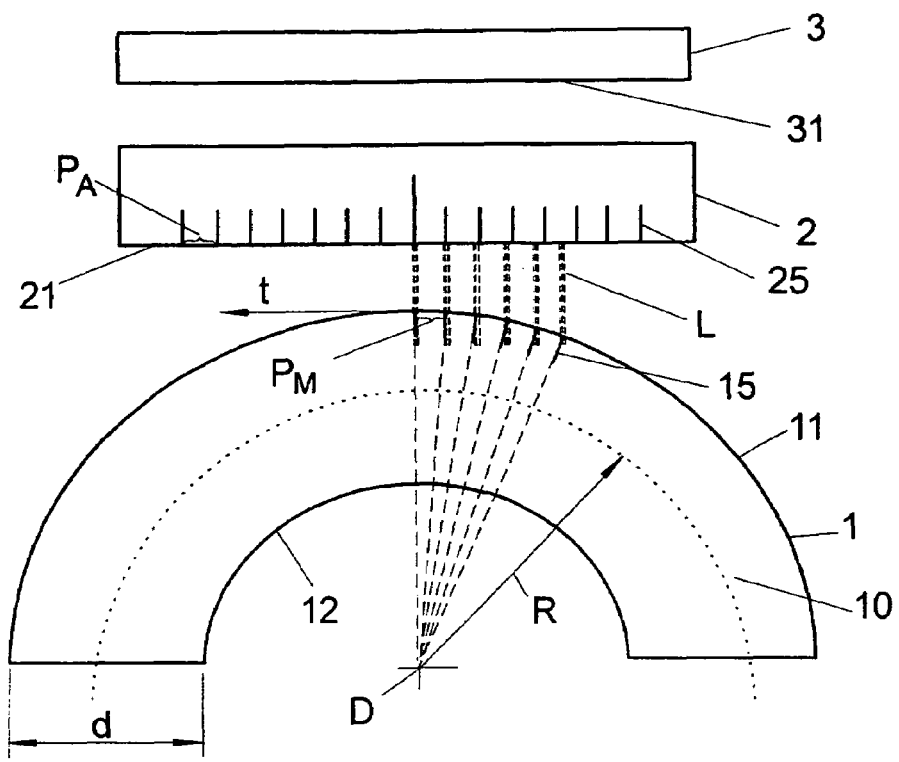
FIG. 1a is a schematic view of a section of a measuring strip, arranged in the shape of a ring, having a periodic measuring graduation, as well as an allocated scanning plate having a periodic scanning graduation and a detector.

FIG. 1a illustrates schematically a position-measuring device for angular measurement having a measuring strip 1 of finite thickness d arranged in the shape of a ring along a circular arc, and having a scanning unit which includes a scanning plate 2 and a detector 3 in the form of a photodetector.

Measuring strip 1 and scanning unit 2, 3 are movable relative to each other, e.g., in that measuring strip 1 is affixed to the outer periphery of a drum rotatable about an axis D, and scanning unit 2, 3 is arranged in a stationary manner in front of outer surface 11 (outer ring surface) of measuring strip 1, (and set apart from it in radial direction R).

Measuring strip 1 of thickness d, arranged in the shape of a ring along a circular arc 10 having radius R, has an outer ring surface 11 provided with a periodic measuring graduation 15 in the form of a line graduation, as well as an inner surface 12 (inner ring surface). Due to the annular arrangement of flexible measuring strip 1, its outer ring surface 11 is elongated—compared to a linear arrangement of measuring strip 1 along a straight line—while inner ring surface 12 is compressed.

Because of the elongation of outer ring surface 11 of measuring strip 1 arranged in the shape of a ring, period $P_M$ of periodic measuring graduation 15 of measuring strip 1, thus the distance between adjacent graduation marks of measuring graduation 15 formed as a line graduation, is somewhat larger than for a linear, flat arrangement of the measuring strip along a straight line ("elongation effect").

A scanning plate 2 of scanning unit 2, 3 allocated to measuring strip 1 is arranged in front of and set apart from outer ring surface 11 of measuring strip 1, and is provided with a periodic scanning graduation 25 on its surface 21 facing outer ring surface 11. Surface 21 of scanning plate 2 facing outer ring surface 11 of measuring strip 1, as well as scanning graduation 25 formed there, each extend parallel to a tangent t at outer ring surface 11 of measuring strip 1.

Figure 1B:
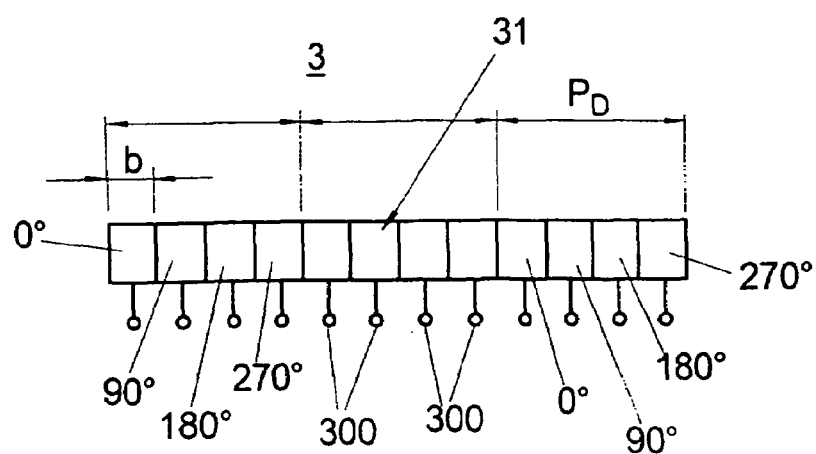

Viewed from measuring strip 1, a detector 3, a so-called structured photodetector, having a radiation-sensitive surface 31 is arranged behind scanning plate 2. As illustrated in FIG. 1b, its radiation-sensitive surface 31 is formed by a plurality of detector elements in the form of photoelements arranged one after the other and having a width b. In each case four detector elements form one detector group, the four detector elements of one detector group each being allocated to one of the four phases 0°, 90°, 180° and 270°. Period $P_D$ of this arrangement of detector elements corresponds to fourfold the width b of a single detector element of the phase 0°, 90°, 180° or 270°.

Also illustrated schematically in FIG. 1b are electrical connections 300 of the individual photoelements which form radiation-sensitive surface 31 of photodetector 3, photoelements of different detector groups and allocated to the same phase 0° or 90° or 180° or 270° being interconnected so that their output signals may be jointly supplied for evaluation to an evaluation unit.

FIG. 1b illustrates three detector groups from radiation-sensitive surface 31 of photodetector 3, each made up of four detector elements (photoelements) of the phase 0° or 90° or 180° or 270°. This is only a section of radiation-sensitive surface 31 of photodetector 3, which may have ten to fourteen such detector groups arranged periodically one after the other and each made up of four photoelements.

The above-described scanning unit 2, 3 of the position-measuring device (angular position measuring device) illustrated in FIGS. 1a and 1b is used for the optical scanning of measuring graduation 15 on outer ring surface 11 of measuring strip 1 arranged in a ring shape along a circular-arc segment 10. To that end, outer ring surface 11 of measuring strip 1, provided with measuring graduation 15, may be irradiated in a conventional manner with collimated electromagnetic radiation L in the form of light that was generated by a suitable illumination unit (light source) and collimated by a suitable condenser lens as described, for example, in European Published Patent Application No. 1 081 457. Light L used for scanning measuring graduation 15 on outer ring surface 11 of measuring strip 1 interacts both with scanning graduation 25 of light-transmitting scanning plate 2, which may be arranged in a conventional manner in the beam path of light L, as well as with measuring graduation 15 on outer ring surface 11 of measuring strip 1, at which light L is reflected.

Light beams L, modified both by scanning graduation 25 and by measuring graduation 15, form on radiation-sensitive surface 31 of photodetector 3 a so-called Vernier stripe pattern having a period that is defined by period $P_A$ of scanning graduation 25 and period $P_M$ of measuring graduation 15.

The photoelements arranged on radiation-sensitive surface 31 of photodetector 3 generate an electrical signal, corresponding to this stripe pattern, which is supplied to an evaluation unit that, by evaluating the electrical output signals of photodetector 3, ascertains the extent of a relative movement between measuring strip 1 and scanning unit 2, 3.

Based on FIG. 1a, it should be apparent that, viewed from scanning plate 2, period $P_M$ of measuring graduation 15 in the region opposite the middle region of scanning plate 2 is seemingly larger than in the regions opposite the outer ends of scanning plate 2. This is attributable to the aspect that, because of the curvature 1/R of measuring strip 1 arranged in the shape of a ring, and because of the tangential arrangement of scanning plate 2 and photodetector 3 with respect to measuring strip 1, the location-dependent effective period $P_{eff}$ of measuring strip 1 operative at radiation-sensitive surface 31 of detector 3 is based on a projection of measuring graduation 15 onto scanning plate 2 along a direction perpendicular to tangent t, along which scanning plate 2 extends. The projection effect described thus leads to a seeming decrease of period $P_M$ of the measuring graduation in the regions opposite the tangential edge regions of scanning plate 2 compared to the region of measuring graduation 15 opposite the middle of scanning plate 2.

This projection effect is contrary to the earlier-described elongation effect as a result of the elongation of outer ring surface 11 of measuring strip 1 when arranged in the shape of a ring. In contrast to the projection effect, however, the elongation effect is not a function of location.

In the following, the results of the elongation effect and of the projection effect are described quantitatively in somewhat greater detail by clarifying the consequences of these two effects on the stripe pattern generated on radiation-sensitive surface 31 of photodetector 3, the stripe pattern when scanning a measuring strip arranged in linear fashion along a straight line being compared to the stripe pattern of a measuring strip arranged in ring-like fashion.

In a linear position-measuring system having a measuring strip arranged in flat fashion along a straight line, whose periodic measuring graduation has period $P_M$, and having a scanning plate, assigned to the measuring strip and extending parallel thereto, whose scanning graduation has period $P_A$ (amplitude period), the following applies for the period of the stripe pattern which corresponds to the intensity pattern described above and which is generated by interaction of the light, used for scanning the measuring strip, with the scanning graduation on one hand and with the measuring graduation on the other hand:

$$P_V = 1/(1/P_A - 1/P_M),$$

$P_V$ being designated as the so-called Vernier period (cf., European Published Patent Application No. 1 028 309).

From the equation above, it follows that the more sharply graduation periods $P_A$ and $P_M$ of the scanning graduation on one hand and the measuring graduation on the other hand differ, the smaller the Vernier period $P_V$ is.

Thus, for example, given a period of the scanning graduation $P_A = 19.512$ μm and a period of the measuring graduation $P_M = 20$ μm, then $P_V = 800$ μm results for the Vernier period $P_V$ of the generated stripe pattern ("light-dark pattern"). This period of the stripe pattern may be taken into account when designing a structured photodetector intended to generate electrical output signals from the stripe pattern which are to be supplied to an evaluation unit. To that end, for example, for a photodetector made up of a plurality of photoelements arranged one after the other, four photoelements are arranged one after the other per period of the stripe pattern, each photoelement having an extension (along the extension direction of the radiation-sensitive surface of the photodetector) of 200 μm and being assigned to a specific phase, e.g., 0°, 90°, 180° or 270°. In this context, the extension of the active surface of the respective photoelement is somewhat smaller than the 200 μm indicated, since an edge for insulation may in each case be provided between the individual photoelements.

Thus, in this case, Vernier period $P_V$ of the stripe pattern generated by interaction of the light, used for the scanning, with the scanning graduation on one hand and with the measuring graduation on the other hand, agrees exactly with period $P_D$, to which the radiation-sensitive surface of the detector is attuned.

Figure 2:
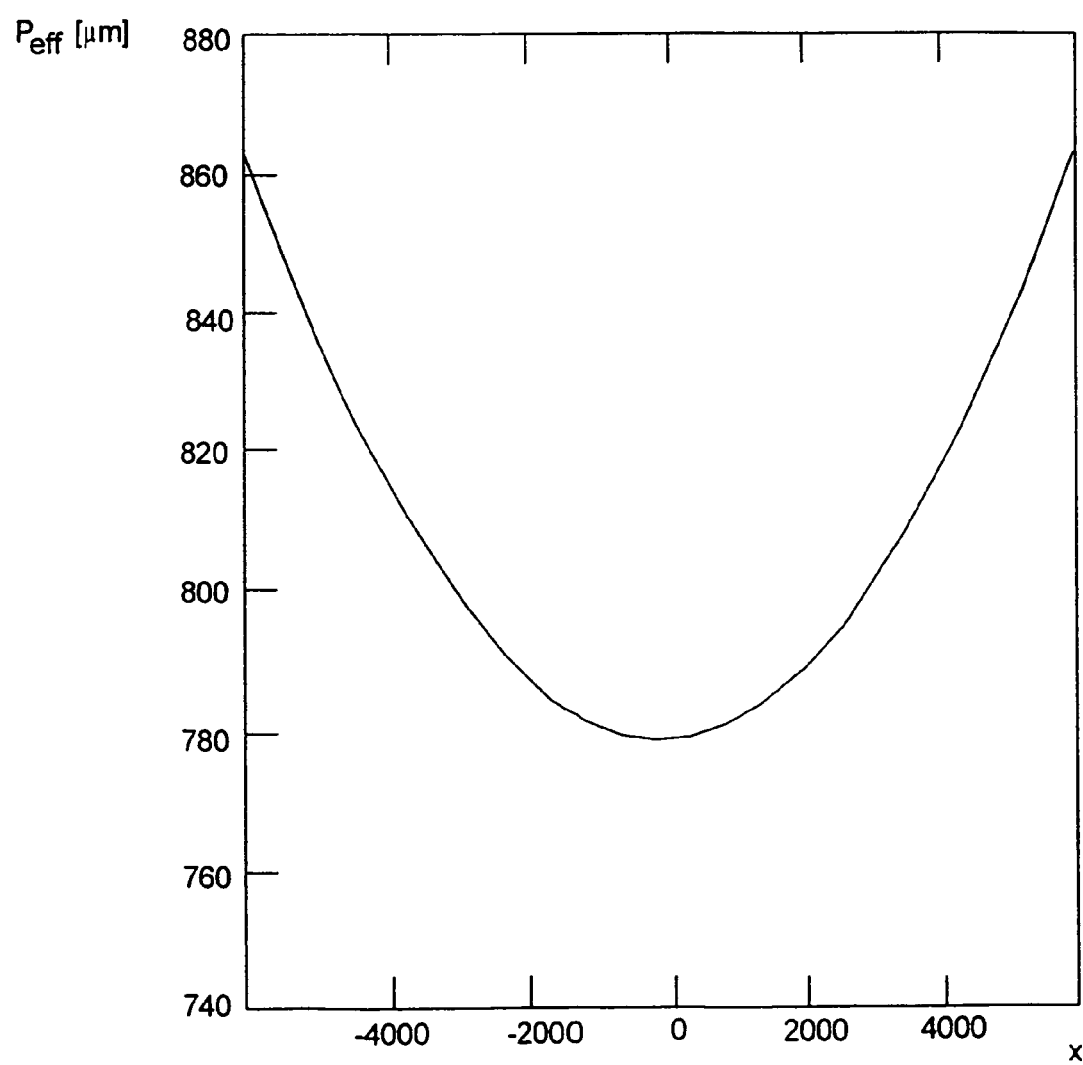
FIG. 2 is a graphic representation of the influence of the elongation effect and the projection effect on the period of a stripe pattern, generated on the radiation-sensitive surface of the detector, when using a position-measuring device illustrated in FIGS. 1a and 1b because of a ring-shaped arrangement of the measuring strip.

If the same detector type, thus a photodetector having a two-dimensional planar surface, formed by photoelements arranged periodically one after the other, is used as a component of a scanning unit for a measuring strip arranged in ring-like fashion, then the result of the two effects described above, namely the so-called elongation effect on one hand and projection effect on the other hand, is that the effective Vernier period $P_{eff}$ operative at the radiation-sensitive surface of the photodetector is a function of location. Specifically, because of the elongation effect, it is smaller as far as the amount is concerned in the middle region of the radiation-sensitive surface than Vernier period $P_V$ in the linear case, but increases toward the edges because of the projection effect. This is discernible in FIG. 2, where effective Vernier period $P_{eff}$ is represented as a function of position x on the structured photodetector. It is recognizable that effective Vernier period $P_{eff}$ in the middle of the photodetector (given x=0) assumes a smaller value than Vernier period $P_V$ of the stripe pattern in the linear case ($P_V = 800$ μm) and then increases toward the edges of the photodetector (for x>0 or x<0). In this context, the effective Vernier period $P_{eff}$ is understood to mean the locally variable extension of a pair of light-dark stripes of the Vernier stripe pattern.

If one observes the stripe-pattern phase, which in the case of a linear measuring strip increases linearly by 2*Pi within one detector period—thus coincides with the detector phase and therefore supplies an optimal contrast in the detector signals—then the phase for a curved measuring strip initially is somewhat ahead of the phase of the detector in the middle of the detector (since the effective Vernier period $P_{eff}$ is smaller here than the detector period), while it lags behind toward the edge of the detector (since here the effective Vernier period $P_{eff}$ is larger than the detector period). This phase difference causes the contrast in the detector signals to deteriorate. The phase of the stripe pattern may be determined from the local graduation periods of the scanning graduation and of the measuring graduation, as well as the geometrical conditions such as the curvature of the measuring graduation and the distance of the detector from the measuring graduation.

The increase of effective Vernier period $P_{eff}$ toward both edges of the radiation-sensitive surface of the photodetector is a result of the projection effect which leads to a reduction of the period of measuring graduation $P_M$ toward the edges, and therefore to a decrease of the difference $1/P_A - 1/P_M$, which in turn, according to the above equation, leads to an increase of the Vernier period.

Since of the two effects indicated above, the elongation effect is independent of location, but the projection effect is location-dependent, these two contrary effects may not completely offset each other. However, it is possible to coordinate periods $P_A$ and $P_M$ of scanning graduation 25 on one hand and of measuring graduation 15 on the other hand with one another such that an optimized scanning signal may be obtained for a subsequent evaluation.

A simple analytical calculation of a correction value for period $P_M$ of measuring graduation 15 or period $P_A$ of scanning graduation 25 is not possible. The reason is that, first of all, the elongation effect on one hand and the projection effect on the other hand are dependent in a different manner on the curvature of measuring strip 1, i.e., its radius R, and secondly, the elongation effect is also strongly dependent on thickness d of measuring strip 1 (see FIG. 1a).

An optimum correction value for period $P_M$ of measuring graduation 15 may be determined, for example, by totaling the intensity of the light arriving in the detector regions of the same phase for different periods $P_M$. With knowledge of the phase position of the stripe pattern relative to the detector phase, this may be carried out in a simple manner by a vector addition. A maximum of the scanning signals may thus be ascertained by iterative alteration of period $P_M$ of measuring graduation 15.

Figure 3A:
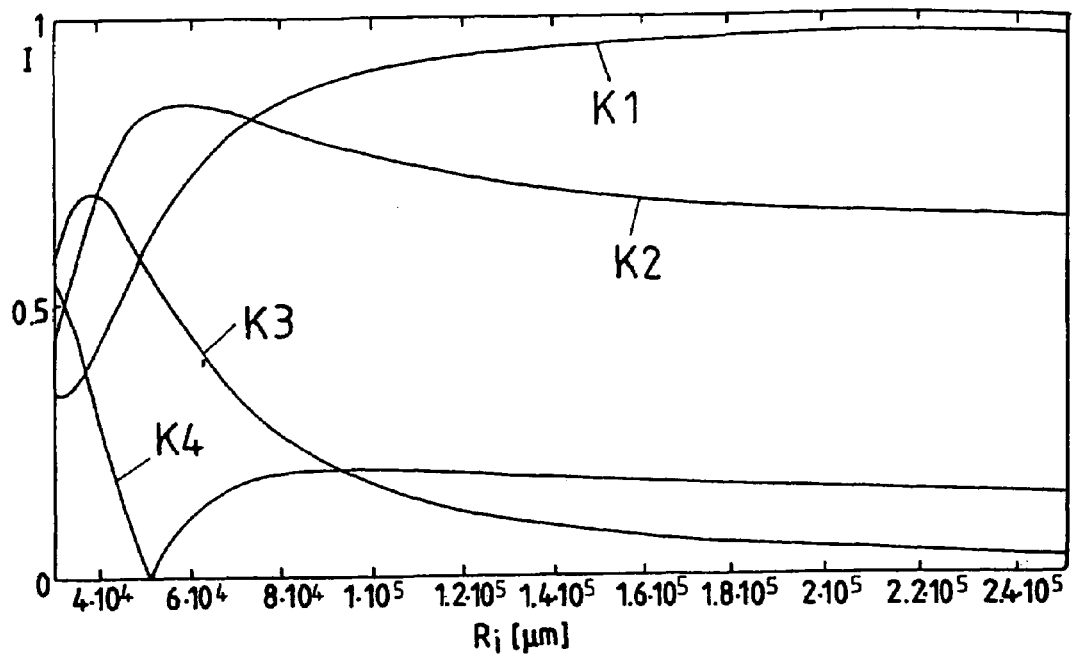
FIGS. 3a and 3b illustrate consequences of the elongation effect and the projection effect on the normalized signal amplitudes of a position-measuring device illustrated in FIGS. 1a and 1b as a function of the radius of the measuring strip, arranged in a ring shape, for two different thicknesses of the measuring strip.
Figure 3B:
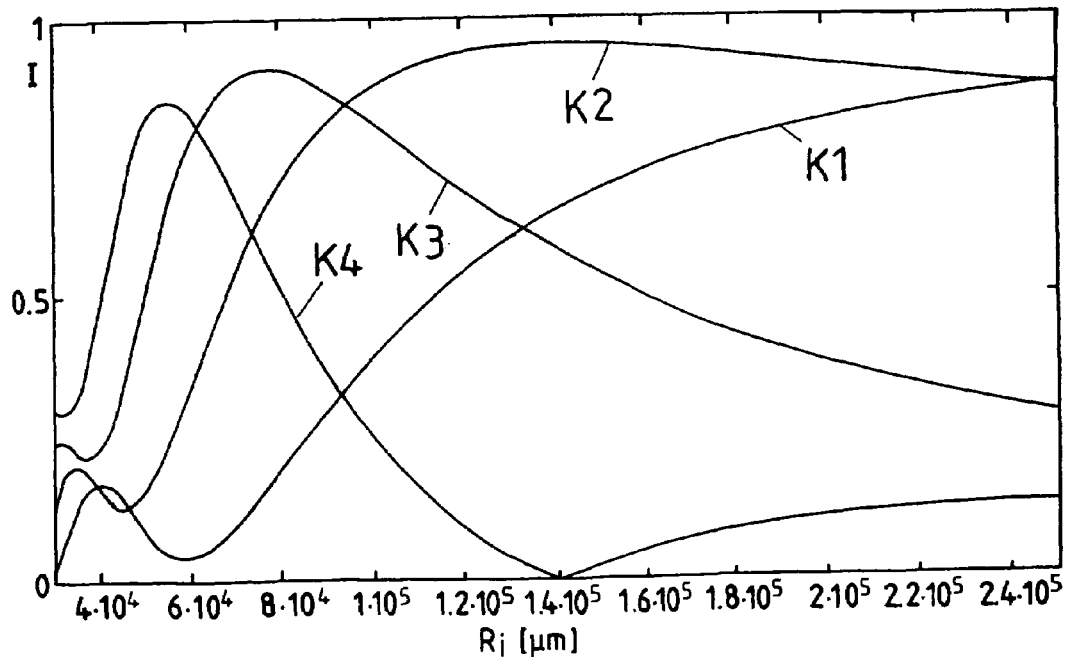

FIGS. 3a and 3b each illustrate the intensity of the scanning signals (for normalization, specific to the linear case) as a function of radius $R_i$ of a drum, on which measuring strip 1 is wound, for a thickness d of measuring strip 1 of 300 µm (FIG. 3a) and for a thickness d of measuring strip 1 of 75 µm (FIG. 3b), and specifically in each case for different periods $P_M$ of measuring graduation 15. In FIGS. 3a and 3b, in each case curve K1 indicates the case $P_M$=20 µm (thus agreement with the period of the measuring graduation for a linear arrangement), curve K2 indicates the case $P_M$=20.02 µm, curve K3 indicates the case $P_M$=20.04 µm, and curve K4 indicates the case $P_M$=20.06 µm. Amplitude period $P_A$ of scanning graduation 25 is 19.512 µm in all cases, and a structured photodetector 3 is assumed which, with its photoelements, includes fourteen Vernier periods, thus has a total of 56 photoelements arranged one after the other and combined to form fourteen groups.

It is discernible based on FIGS. 3a and 3b that for very small drum radii $R_i$ and therefore for correspondingly small radii R of measuring strip 1 arranged in a ring shape, intensity I of the signal generated by the photodetector in the case of specific curve K1 (takeover of the measuring strip from the linear position-measuring system without correction of period $P_M$ of measuring graduation 15) drops so strongly that a reliable evaluation of the signal may not be possible. This is attributable to the aspect that photodetector 3 is arranged for a stripe pattern having a defined period $P_D$, which in the exemplified case is 800 µm, and from which according to FIG. 2 in the case of a ring-like arrangement of the measuring strip, effective Vernier period $P_{eff}$ deviates perceptibly because of the elongation effect and the projection effect. This holds true in particular for small strip thicknesses d, for which the elongation effect has only a comparatively small consequence, and therefore the projection effect completely asserts itself in the case of small drum radii. This explains the markedly stronger decline of intensity curve K1 in FIG. 3b compared to FIG. 3a. In this regard, FIG. 3b is based on a strip thickness of 75 µm, whereas FIG. 3a is based on a fourfold strip thickness of 300 µm.

It is also discernible that in both cases, markedly higher intensities of the detector signal may be attained for small drum radii when period $P_M$ of the measuring graduation is increased by 0.1% (curve K2), by 0.2% (curve K3) or by 0.3% (curve K4) compared to the linear case. As a function of strip thickness d, for each drum diameter $R_i$ there is an unequivocal value by which period $P_M$ of measuring graduation 15 may be corrected (increased) in order to obtain the greatest possible intensity of the scanning signals. For instance, if, in FIGS. 3a and 3b, one compares the four curves K1, K2, K3, K4 which represent different correction values of period $P_M$ of measuring graduation 15, then in the case of FIG. 3a (corresponding to a strip thickness d=300 µm), given a drum diameter of $5*10^4$ µm (i.e., 50 mm), a period $P_M$ of measuring graduation 15 in the area of 20.02 µm may be provided, while in the case of FIG. 3b (strip thickness d=75 µm) for the corresponding drum diameter, a period $P_M$ of measuring graduation 15 of approximately 20.06 µm may provide particularly great intensities of the detector signal.

Instead of a correction of period $P_M$ of measuring graduation 15 compared to the linear case, period $P_A$ of scanning graduation 25 may also be corrected. While in the case of a correction of period $P_M$ of measuring graduation 15, the correction is implemented by addition of a correction value, in the case of a correction of period $P_A$ of the scanning grating, period $P_A$ may be reduced somewhat, corresponding to the subtraction of a correction value. For, as follows from the above equation for Vernier period $P_V$, what matters for the adjustment of the Vernier period and therefore also the effective Vernier period $P_{eff}$ is the difference between the inverse values of $P_A$ and $P_M$.

In concrete terms, it holds true that given a photodetector coordinated with period $P_D$ of the Vernier stripe pattern, to correct the effective Vernier period $P_{eff}$ for a ring-like arrangement of the measuring strip, either period $P_M$ of the measuring graduation may be corrected so that $P_M > 1/(1/P_A - 1/P_D)$, or period $P_A$ of the scanning graduation may be corrected so that $P_A < 1/(1/P_D + 1/P_M)$.

What is claimed is:

1. A position-measuring device, comprising:
   a measuring graduation arranged around a material measure arranged in a ring shape; and
   a scanning unit configured to optically scan the measuring graduation by electromagnetic radiation, the scanning unit including:
      a scanning plate including a periodic scanning graduation arranged in a beam path of the electromagnetic radiation and arranged so that the electromagnetic radiation interacts with the scanning graduation and the measuring graduation; and
      a detector including a detector surface configured to detect the electromagnetic radiation after interaction with the scanning graduation and the measuring graduation in a stripe pattern with a period;
   wherein the following condition is satisfied:

$1/(1/P_A - 1/P_M) < P_D$;

$P_M$ representing a period of the measuring graduation, $P_A$ representing a period of the scanning graduation, and $P_D$ representing the period of the stripe pattern;
   wherein the period of the measuring graduation satisfies the condition:
   $P_M > 1/(1/P_A - 1/P_D)$; and
   wherein a deviation of the period of the measuring graduation from a value of $1/(1/P_A - 1/P_D)$ is between 0.1% and 1%.

2. The position-measuring device according to claim 1, wherein the detector includes a planar, substantially two-dimensional detector surface.

3. The position-measuring device according to claim 1, wherein at least one of (a) the measuring graduation and (b) the scanning graduation includes an amplitude grating.

4. The position-measuring device according to claim 1, wherein the scanning graduation includes a mixed amplitude phase grating.

5. The position-measuring device according to claim 1, wherein the scanning graduation includes a phase grating.

6. The position-measuring device according to claim 1, wherein the electromagnetic radiation includes collimated light.

7. The position-measuring device according to claim 1, wherein the period of the measuring graduation and the period of the scanning graduation are configured to maximize an intensity of an output signal generated by the detector.

8. The position-measuring device according to claim 1, wherein the material measure includes a ring-shaped measuring strip.

9. The position-measuring device according to claim 1, wherein the detector surface of the detector includes a periodic arrangement of detector regions having a period corresponding to the period of the stripe pattern.

10. The position-measuring device according to claim 9, wherein the detector regions include detector elements.

11. The position-measuring device according to claim 9, wherein the detector regions include photoelements.

12. The position-measuring device according to claim 9, wherein groups of four detector regions are arranged as detector groups, the detector groups arranged periodically one after another with a defined period.

13. The position-measuring device according to claim 12, wherein individual detector regions of each detector group correspond to one phase, in-phase detector regions of different detector groups electrically interconnected.

14. A position-measuring device, comprising:
a measuring graduation arranged around a material measure arranged in a ring shape; and
a scanning unit configured to optically scan the measuring graduation by electromagnetic radiation, the scanning unit including:
  a scanning plate including a periodic scanning graduation arranged in a beam path of the electromagnetic radiation and arranged so that the electromagnetic radiation interacts with the scanning graduation and the measuring graduation; and
  a detector including a detector surface configured to detect the electromagnetic radiation after interaction with the scanning graduation and the measuring graduation in a stripe pattern with a period; wherein the following condition is satisfied:

$1/(1/P_A - 1/P_M) < P_D;$ $P_M$ representing a period of the measuring graduation, $P_A$ representing a period of the scanning graduation, and $P_D$ representing the period of the stripe pattern;
wherein the detector surface of the detector includes a periodic arrangement of detector regions having a period corresponding to the period of the stripe pattern;
wherein the scanning graduation includes a mixed amplitude phase grating;
wherein the period of the measuring graduation satisfies the condition:

$P_M > 1/(1/P_A - 1/P_D);$ and wherein a deviation of the period of the measuring graduation from a value of $1/(1/P_A - 1/P_D)$ is between 0.1% and 1%.

* * * * *